United States Patent Office 3,851,039
Patented Nov. 26, 1974

3,851,039
METHOD FOR THE TREATMENT OF A CRAZED SURFACE OF A WEB EXPANDED POLYSTYRENE
Maurice W. Blackwelder, Dix Hills, N.Y., assignor to Owens-Illinois, Inc.
Filed Dec. 20, 1972, Ser. No. 316,759
Int. Cl. B29c 25/00; B29d 27/00; B44d 5/00
U.S. Cl. 264—321                        7 Claims

ABSTRACT OF THE DISCLOSURE

A method for the treatment of a web or sheet of expanded polystyrene, especially expanded, high density general purpose polystyrene, in which the surface of the web is heated to cause the inherently crazed and flaky dense outer surface or skin thereof to fuse together and is then quickly cooled to prevent the heat from penetrating to an appreciable depth into the thickness of the web, which could lead to further expansion of residual blowing agent. Treatment of only one side of a web in this manner, for example the side constituting the radially outermost side of a web produced by slitting a tubular extrudate, which side is generally the more severely crazed side due to the inherently faster cooling that such a tubular extrudate experiences, greatly improves the resistance of the web to flaking and scuffing in subsequent handling operations, for example, in the printing of such web and/or in the fabrication thereof into cups, containers or other products. The untreated side of a web which is so treated on the other side will retain its initial high gloss, and such a glossy surface is very important where it is desired to apply printed matter and/or other decorative matter thereto.

Background of the Invention

As is well understood in the art, sheetlike expanded or foam polystyrene, in a wide variety of densities, thicknesses and resin grades, can be produced by extruding a longitudinally seamless tube of such material at a suitably high temperature from conventional extrusion equipment, by quickly cooling the extruded tube to prevent further and uncontrolled expansion of the blowing agent which is normally added to the resin composition, and by slitting the cooled tube along one or more longitudinally extending lines to form one or more longitudinally extending webs therefrom. In such an arrangement, it is desirable to quickly cool the warm, extruded tube on both the inner and outer surfaces thereof to form thin skins of appreciably greater density and toughness than the interior or core portion of the wall of the tube between such skins in order to inpart durability to the products formed from such webs. In certain cases such skins are also desired to impart solvent impermeability to the web, for example, to resist the penetration of a solvent-type adhesive which is often used to bond sheets of such materials to similar materials or to other materials, in a known manner.

In the cooling of a warm, seamless extruded tube of expanded polystyrene, the outer surface of the tube normally cools somewhat more rapidly than the inner surface, due to its exposure to natural convention and to cooler surroundings. This more rapid cooling can lead to the formation of small fine cracks in the outer surface due to shear stresses arising from the temperature differential across the thickness of the web, and the effect is more pronounced in webs formed from more brittle and less expensive grades of polystyrene such as general purpose polystyrene. The presence of these cracks or fractures can be demonstrated by directing polarized light against the surface of the finished web, as such a surface will give interference color due to the variations in the refractive index of the crazed matter.

The presence of surface cracks or fractures in one surface of a web or sheet of polystyrene foam is especially undesirable where such web or sheet will be exposed to a substantial degree of subsequent mechanical handling. This may comprise, for example, the handling involved in the printing, winding and unwinding of such web or sheets and, in the case of webs or sheets destined for the manufacture of nestable cups or containers, in the cutting of blanks therefrom and in the rolling or winding of such blanks into tubular articles. In any case, the presence of a badly crazed or fractured surface in a web or sheet of polystyrene foam, when it is exposed to such handling equipment, will cause portions of the sheet to flake off, and the material which does flake off is apt to build up on machine parts, thereby interfering with productivity and leading to further reduced product quality.

General Description of the Invention

In accordance with the present invention, however, the crazed or fractured surface of a web of expanded polystyrene may be effectively treated or repaired, to greatly increase the scuff or abrasion resistance of such web and to improve the handling characteristics of the web as it passes through subsequent mechanical handling devices, and such treatment may be simply and conveniently performed as part of the web forming operation and without adverse effect on other desirable properties of the web, including density, caliper and solvent penetration resistance and gloss of the untreated side. More particularly, the web may be so treated by providing a web heating station, to heat the crazed surface portion of the web to a temperature at which the surface is sufficiently soft to permit the particles on the surface to be re-fused or re-adhered to the parent sheet or to one another, and by providing a web cooling station to quickly chill the heated surface before the heat can penetrate a material depth into the web, which could lead to expansion of residual blowing agent, and thence to reduced foam density and increased web thickness.

The heating of the web surface can be accomplished quite conveniently by means of a heated, Teflon-coated roller disposed normally to the path of travel of the web, in association with one or more idler rollers to maintain a substantial angle of wrap between the moving web and the heated roller. Such a heated roller can readily be incorporated in otherwise conventional handling equipment that is normally utilized in the production of expanded polystyrene webbing, preferably being located downstream of the slitting equipment utilized to slit the parent tubular extrudate into one or more webs and upstream of the winding equipment utilized to wind each such web into a coil. In any case, the web cooling station should be located immediately downstream of the web heating station and the cooling can be accomplished by means of an internally cooled metal roller disposed normally to the path of travel of the web and, relative to the heated roller, in a manner to provide a substantial angle of wrap between the moving web and the cooled roller.

Accordingly, it is an object of the present invention to provide an improvement in the method of producing expanded polystyrene webbing. More particularly, it is an object of the present invention to provide an improvement in the method of producing webbing from expanded polystyrene in which the webbing has rather shallow, dense top and bottom skins with a rather thick, low density core sandwiched therebetween and inegral therewith. More particularly, it is an object of the present invention to provide a method of repairing or restoring the crazed dense skin of a web of expanded polystyrene to improve the resistance of such skin to scuffing, abrasion or flaking in printing and/or other mechanical handling operations and without reducing the glossiness of the other surface of the web or otherwise adversely affecting other desirable properties of the web. More particularly, it is an object of the present invention to provide a method for producing, from a general purpose grade of polystyrene, a web of such material with dense, shallow outer layers and a deep inner core of low density therebetween and integral therewith, in which one of said layers has high gloss and in which the other of said layers has good resistance to abrasion or scuffing.

For a further understanding of the present invention and the objects thereof, attention is directed to the drawing, to the following description thereof, to the detailed description of the invention and to the appended claims.

Detailed Description of the Invention

Figure 1:
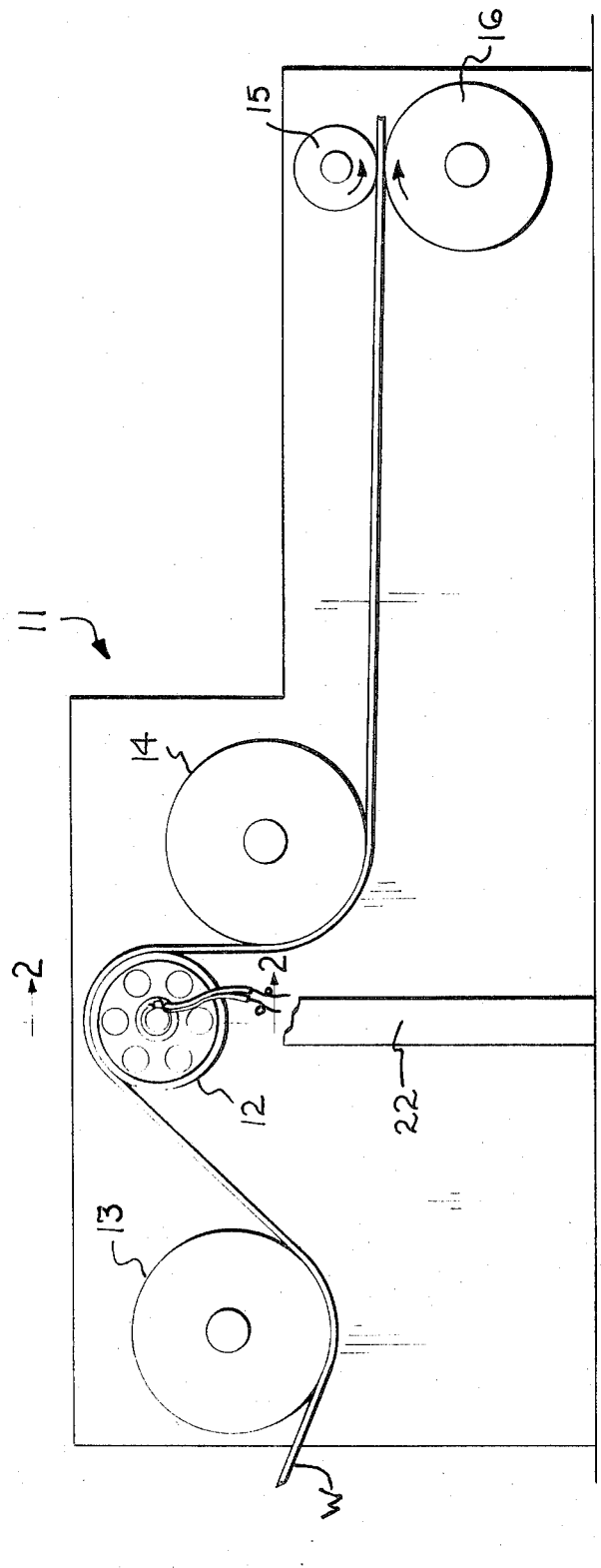
FIG. 1 is a fragmentary elevational view of apparatus for practicing the method of the present invention.

FIG. 1 illustrates apparatus, indicated generally at 11, for practicing the treatment method of the present invention in relationship to a continuously moving endless web W of expanded polystyrene. Apparatus 11 may be considered to be in line with, and immediately downstream of any of the many well known types of apparatus (not shown) for extruding a seamless tube of polystyrene, comprising minor amounts of a blowing agent and a neucleating agent intimately mixed therein as is well understood in the art, at a sufficiently high temperature to lead to foaming of the extrudate by the expansion of the blowing agent and the formation of cells around the particles of the neucleating agent. Such apparatus normally also comprises cooling means (not shown) downstream of the extruder outlet for chilling both the inside and outside surfaces of the extruded tube after a predetermined degree of expansion or foaming of the polystyrene has taken place. Because of the finite thickness of the wall of the tubular extrudate and the low thermal conductivity of the foamed or expanded polystyrene from which it is formed the surfaces of the extrudate normally cool much more rapidly than the interior or core portion thereof. This differential rate of cooling allows the core of the extrudate to continue to expand after the expansion of the surface portions has ceased, thereby resulting in an extrudate having rather shallow surface or "skin" portions of appreciably greater density than the interior portion, as is well understood in the art, and these skins are desirable because they increase the resistance of products made from such material to surface damage by impact or wear and they impart an attractive exterior appearance to such products.

The manufacture of tubular extrudates of expanded polystyrene, as heretofore described, is normally characterized by a somewhat faster rate of cooling of the radially outermost surface of the extrudate, due to its exposure to natural convection and cooler ambient surroundings, than the rate of cooling experienced by the radially innermost surface. Such a differential cooling rate can lead to the formation of shallow surface cracks or fractures in the radially outermost surface of foam extrudates that are mainly composed of a rather brittle grade of polystyrene, such as a general purpose grade of polystyrene or, to a somewhat lesser extent, a medium impact grade of polystyrene.

A tubular extrudate composed mainly of a brittle grade of expanded, polystyrene, with the radially outermost skin thereof having many shallow cracks or fractures, produced in the manner heretofore described, will normally be slit along one or more continuous longitudinally extending lines by slitting means (not shown) which may be considered to comprise a part of the extrusion equipment, thereby forming one or more endless webs of which web W may be considered to be included. Before web W is subjected to the mechanical handling involved in winding it into coils, by means (not shown) which may be considered to be downstream of apparatus 11, the crazed surface thereof, which may be considered to be the underside of the web as it enters apparatus from the left of FIG. 1, is treated to increase its resistance to damage by such winding operation and possibly other subsequent mechanical handling operations such as printing and/or the fabrication of nestable drinking cups or other articles therefrom. Such treatment comprises the heating of the crazed underside of the moving web by placing an internally heated roller 12 in the path of travel of the web, and an idler roller 13 is located immediately upstream of roller 12 to maintain a sufficient angle of wrap between the web W and roller 12 to provide sufficient contact time for proper heating of the surface of the web.

The heating of the fractured surface of web W by heated roller 12, in the manner described above, must be promptly followed a cooling step to prevent the heat from penetrating into the web to any appreciable degree; otherwise, such heat would cause residual blowing agent which is still in such web to expand, thereby increasing the thickness of the web, decreasing its average density, detracting from the lustre or glossiness of the opposed skin of the web, reducing the resistance of the web to the penetration of solvents or otherwise detracting from desired characteristics of the web. Accordingly, there is provided an internally cooled roller 14 immediately downstream of roller 13 to cool the web from the opposed surface, and a suitable angle of wrap is maintained, by the position of roller 14 relative to roller 13 and to opposed counterrotating take off rollers 15 and 16, to achieve sufficient contact time between the web and the cooled roller for adequate cooling of the web.

In the practice of the present invention, as heretofore described, the crazed surface or skin of web W must be heated to the softening point of the polystyrene resin that is used in the manufacture of the web, so that the particles present on the skin will be re-fused to the parent web or to one another. In practice, such heating can be achieved, in webs made from general purpose grades of polystyrene, with rollers heated to a roller surface temperature of the order of 300° F. to 425° F. and with an angle of wrap, between the heated roller and the web, sufficient to provide contact times of the order 0.25 seconds. Especially good results have been obtained with such webs using a 6 inch O.D. roller with a surface temperature of the order of 335° F. to 350° F. and a contact time of 0.25 seconds. In any case, adequate cooling of the web was achieved with an 8 inch O.D. cooled roller with sufficient cooling to maintain the outer surface thereof at a temperature of 70° F. and with a contact time of 0.40 seconds.

Figure 2:
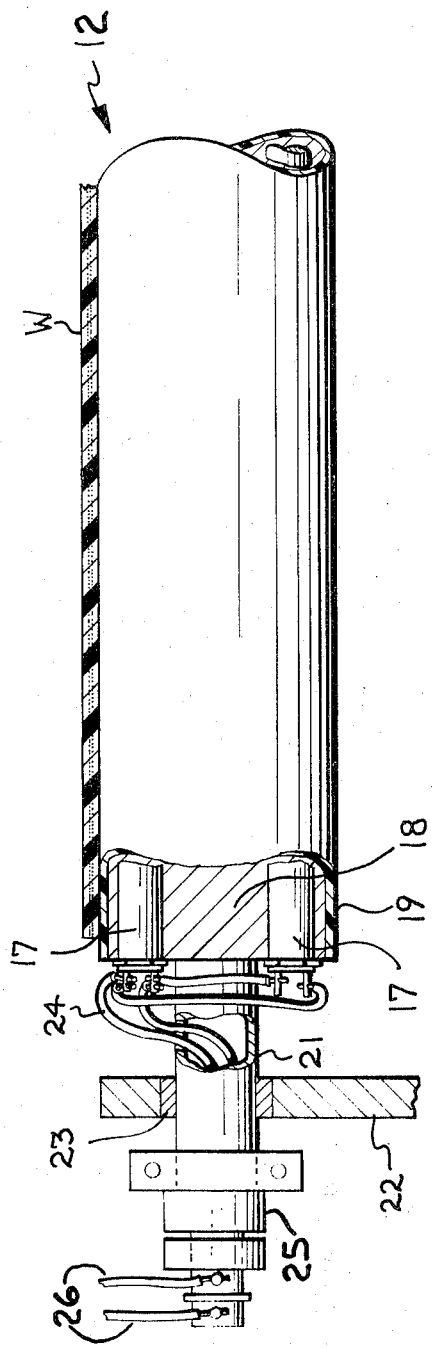
FIG. 2 is a fragmentary sectional view taken on line 2—2 of FIG. 1.

The internally cooled roller 14 may be constructed in a known fashion, to accommodate the circulation of water or other coolant therethrough, and its construction need not be described in any additional detail. Internally heated roller 12, on the other hand, is of somewhat special construction, and a preferred embodiment thereof is shown in cross-section in FIG. 2. Such a roller is heated by means of a plurality of resistance heating elements 17 enclosed within the main body 18 of the roller and extending parallel to one another and to the longitudinal central axis of the roller body. Because of the temperature to which the web W must be heated by contact with roller 12, the outermost contact surface of the roller body is comprised of a sheath or coating 19 of Teflon brand polytetrafluoroethylene resin or other material which will prevent particles of the heated web from adhering thereto.

Attached to opposed ends of roller body 18 and extending coaxially therewith are opposed stub shafts 21, only one of which is illustrated. Each of such stub shafts extends through roll support structure 22 comprising a portion of the main frame to which all of the rollers are attached, and each of the stub shafts is journalled in a bearing 23 mounted in structure 22. At least one of the stub shafts 21 is hollow in construction and electrical connectors 24 from elements 17 pass therethrough to a rotary electrical connector 25 of conventional construction, to permit power from stationary electrical lines 26 to be transmitted to rotating connectors 24, and thence to elements 17.

It is believed that the utility of the invention may be better understood by reference to the following example, which is not to be construed as limiting the scope of the invention in any way.

Example

An untreated sample of a web of expanded, general purpose polystyrene (Sinclair Koppers designation 8 GP), comprising a minor residual amount of blowing agent (Pentane) dispersed therein, which was produced from a seamless tubular extrudate, had the following properties:

| | |
|---|---|
| Caliper (mils) | 16.0 |
| Density (lbs./cu. ft.) | 15.6 |
| Opacity (percent) | 80.8 |
| Gloss—Exterior Side (percent) | 96.0 |
| Gloss—Interior Side (percent) | 100.0 |
| Cell Size (Sq. mm.) | 0.017 |
| Solvent Penetration (secs.) | 7.4 |
| Scuff Resistance—Exterior Side | Poor |

In contrast, a sample of such a web, treated in accordance with the present invention, by contact for 0.25 seconds with a roller heated to an exterior temperature of 350° F. and thence by contact for 0.40 seconds with a roller cooled to an exterior temperature of 70° F., had the following properties, expressed in the same units:

| | |
|---|---|
| Caliper | 15.4 |
| Density | 15.5 |
| Opacity | 80.7 |
| Gloss—Exterior Side | 100.0 |
| Gloss—Interior (treated) Side | 54.0 |
| Cell Side | 0.017 |
| Solvent Penetration | 7.8 |
| Scuff Resistance—Exterior Side | Good |

Thus, it is apparent that the only appreciable effects on the properties of the web, when treated in accordance with the present invention, were improved scuff resistance and reduced gloss on the treated side. The web was intended to be used for the manufacture of articles which were to be printed on the untreated side, and the reduced gloss of the treated side, therefore, was of no particular disadvantage.

The best mode known to me to carry out this invention has been described above in terms sufficiently full, clear, concise and exact as to enable any person skilled in the art to make and use the same. It is to be understood, however, that it is within my contemplation that certain modifications of the above-described mode of practicing the invention can be made by a skilled artisan without departing from the scope of the invention and it is, therefore, desired to limit the invention only in accordance with the appended claims.

I claim:

1. In the manufacture of sheetlike expanded polystyrene, said sheetlike polystyrene having shallow, dense opposed major surfaces with a thick core of reduced density therebetween and integral therewith, said sheetlike polystyrene comprising residual blowing agent which is capable of expansion, when heated to a temperature which will soften said sheetlike polystyrene, to increase the thickness and reduce the density thereof, one of said opposed major surfaces being crazed and subject to damage by abrasion during mechanical handling of said sheetlike polystyrene, the method of repairing said crazed surface to improve its abrasion resistance without materially changing the thickness or density of said sheetlike polystyrene and without materially reducing the gloss of the other of said opposed surfaces, said method comprising the steps of: heating said one of said opposed surfaces of said sheetlike expanded polystyrene to soften said surface, so that particles present thereon will be fused to said surface, and quickly cooling the heated surface of said sheetlike polystyrene below the softening point thereof before the heat penetrates into said sheetlike polystyrene to an appreciable depth.

2. The method of claim 1 wherein said sheetlike polystyrene comprises a major portion of a general purpose grade of polystyrene.

3. The method of claim 1 wherein said sheetlike polystyrene comprises a major portion of a medium impact grade of polystyrene.

4. The method of claim 1 wherein said sheetlike polystyrene comprises a longitudinally moving web of indefinite length thereof; and wherein said one of said opposed surfaces is heated by passing the web over an internally heated polytetrafluoroethylene coated roller and wherein said surface is cooled by passing the web over an internally cooled roller located immediately downstream of said internally heated roller.

5. The method of claim 4 wherein said longitudinally moving web of polystyrene comprises a major portion of a general purpose grade of polystyrene, and wherein said internally heated roller is heated to a temperature in the range of 300° F. to 425° F.

6. The method of claim 5 wherein said temperature is of the order of 335° F. to 350° F. and wherein the angle of wrap of said web about said internally heated roller is sufficient to provide contact therebetween for a period of the order of 0.25 seconds.

7. The method of claim 5 wherein said internally cooled roller is cooled to a temperature of the order of 70° F. and wherein the angle of wrap of said web about said internally cooled roller is sufficient to provide contact therebetween for a period of the order of 0.40 seconds.

References Cited

UNITED STATES PATENTS

| | | | |
|---|---|---|---|
| 3,767,523 | 10/1973 | Schwarz | 161—164 X |
| 2,514,088 | 7/1950 | Pinsky | 264—346 |
| 2,688,772 | 9/1954 | Sandorff | 264—346 |
| 3,121,132 | 2/1964 | Del Bene | 264—53 |
| 3,335,207 | 8/1967 | Richie | 264—51 UX |
| 2,896,264 | 7/1959 | Natta et al. | 264—346 X |
| 3,066,382 | 12/1962 | Zweigle et al. | 264—51 X |
| 3,303,159 | 2/1967 | Saunders | 264—346 X |

OTHER REFERENCES

Parmenter, F. J.: "The Annealing of Polystyrene." In *British Plastics*, May 1953, pp. 154–159.

Ritchie, P. D. edt.: "Physics of Plastics," Princeton, N.J., D. Van Nostrand, c. 1965, pp. 202–208.

"*Kirk-Othmer Encyclopedia of Chemical Technology*," second completely revised edition, vol. 19, "Styrene Plastics," New York, Interscience, c. 1969, pp. 85–95.

"Modern Plastics Encyclopedia, 1970, 1971," vol. 47, No. 10A, October 1970, page 784.

PHILIP E. ANDERSON, Primary Examiner

U.S. Cl. X.R.

161—161, 164, 166; 264—345, 346, DIG 13, DIG 14